United States Patent
Rieger et al.

(10) Patent No.: US 11,826,688 B2
(45) Date of Patent: Nov. 28, 2023

(54) FILTER DEVICE, IN PARTICULAR FOR GAS FILTRATION

(71) Applicant: MANN+HUMMEL GmbH, Ludwigsburg (DE)

(72) Inventors: Mario Rieger, Ludwigsburg (DE); Pedro Miguel Pereira Madeira, Bietigheim-Bissingen (DE); Stefan Kunze, Tuebingen (DE); Ulrich Dehnen, Kornwestheim (DE); Johannes Stuerner, Aidlingen (DE); Markus Beylich, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 689 days.

(21) Appl. No.: 16/935,710

(22) Filed: Jul. 22, 2020

(65) Prior Publication Data

US 2020/0346158 A1    Nov. 5, 2020

Related U.S. Application Data

(63) Continuation of application No. PCT/EP2019/050174, filed on Jan. 4, 2019.

(30) Foreign Application Priority Data

Jan. 24, 2018   (DE) ..................... 10 2018 000 544.6

(51) Int. Cl.
*B01D 46/48*    (2006.01)
*B01D 50/00*    (2022.01)
(Continued)

(52) U.S. Cl.
CPC ......... *B01D 46/48* (2013.01); *B01D 46/0005* (2013.01); *B01D 46/0045* (2013.01);
(Continued)

(58) Field of Classification Search
CPC .............. F02M 35/084; F02M 35/086; B01D 46/0005; B01D 46/48; B01D 46/2403;
(Continued)

(56) References Cited

U.S. PATENT DOCUMENTS 3,535,853 A    10/1970   Brown
4,388,091 A     6/1983   Khosropour
(Continued)

FOREIGN PATENT DOCUMENTS

DE    2819198 A1    11/1978
GB    1185233 A      3/1970

*Primary Examiner* — Minh Chau T Pham

(57) ABSTRACT

A filter device is provided with a filter housing and a filter element arranged in the filter housing. The filter element is provided with an annular filter medium body that has an inflow side. The filter housing has a dirt collecting region in flow communication with the inflow side of the annular filter medium body. The dirt collecting region has an annular circumferentially extending configuration. A flow-tight separation element is arranged at or adjacent to the annular filter medium body. The dirt collecting region adjoins the flow-tight separation element. An inflow region is positioned at the inflow side of the annular filter medium body and immediately adjoins the dirt collecting region. The dirt
(Continued)

collecting region has a radial extension relative to a longitudinal axis of the annular filter medium body, and the radial extension of the dirt collecting region is larger than a radial extension of the inflow region.

13 Claims, 4 Drawing Sheets

(51) Int. Cl.
| | |
|---|---|
| *F02M 35/00* | (2006.01) |
| *B01D 46/00* | (2022.01) |
| *B01D 46/24* | (2006.01) |
| *B01D 46/42* | (2006.01) |
| *F02M 35/02* | (2006.01) |
| *F02M 35/024* | (2006.01) |

(52) U.S. Cl.
CPC ..... *B01D 46/2403* (2013.01); *B01D 46/4272* (2013.01); *B01D 2279/60* (2013.01); *F02M 35/0201* (2013.01); *F02M 35/02416* (2013.01)

(58) Field of Classification Search
CPC ............ B01D 46/2414; B01D 46/4272; B01D 2279/60; B01D 2275/201
USPC ..... 55/385.3, 498, 502, 510, 514; 123/198 E
See application file for complete search history.

(56) References Cited

U.S. PATENT DOCUMENTS

| | | | | |
|---|---|---|---|---|
| 5,730,769 A | * | 3/1998 | Dungs | B01D 46/64 55/482 |
| 5,755,842 A | * | 5/1998 | Patel | B01D 46/0005 55/330 |
| 5,800,581 A | * | 9/1998 | Gielink | B01D 46/62 55/498 |
| 5,808,581 A | * | 9/1998 | Braisted | G01S 19/20 701/503 |
| 5,893,937 A | | 4/1999 | Moessinger | |
| 8,038,756 B2 | * | 10/2011 | Iddings | B01D 46/0012 210/450 |
| 8,790,431 B2 | * | 7/2014 | Muenkel | F02M 35/08 55/482 |
| 8,808,432 B2 | * | 8/2014 | Rotter | B01D 46/2411 96/380 |
| 9,108,137 B2 | * | 8/2015 | Kaufmann | B01D 46/0002 |
| 9,254,457 B2 | * | 2/2016 | Kaufmann | B01D 46/2414 |
| 9,605,626 B2 | * | 3/2017 | Harris | B01D 46/2411 |
| 10,427,080 B2 | | 10/2019 | Stark et al. | |
| 11,471,807 B2 | * | 10/2022 | Rieger | B01D 50/20 |
| 2010/0229511 A1 | * | 9/2010 | Steins | B01D 46/2414 55/498 |
| 2011/0011042 A1 | | 1/2011 | Gillingham | |
| 2013/0232934 A1 | | 9/2013 | Baseotto | |

* cited by examiner

FILTER DEVICE, IN PARTICULAR FOR GAS FILTRATION

CROSS-REFERENCE TO RELATED APPLICATIONS

This application is a continuation application of international application No. PCT/EP2019/050174 having an international filing date of 4 Jan. 2019 and designating the United States, the international application claiming a priority date of 24 Jan. 2018 based on prior filed German patent application No. 10 2018 000 544.6, the entire contents of the aforesaid international application and the aforesaid German patent application being incorporated herein by reference.

BACKGROUND OF THE INVENTION

The invention concerns a filter device, in particular for gas filtration, comprising a filter housing and a filter element with an annular filter medium body, wherein the filter element is received in a receiving space in the filter housing, and comprising a dirt collecting region in the filter housing which is in flow communication with the inflow side of the filter medium body.

U.S. Pat. No. 4,388,091 describes a filter device that is embodied as an air filter and comprises a hollow-cylindrical filter element in a filter housing. The filter element comprises two concentrically arranged perforated cylinders between which a filter medium body is positioned which is flowed through radially from the exterior to the interior by the air to be filtered. In a receiving space in the filter housing in which the filter element is received, a dirt discharge opening is arranged axially upstream of the filter element via which the separated dirt particles are discharged from the receiving space in the filter housing. The dirt discharge opening opens via a funnel into a dirt collecting chamber that is closed by a valve. As soon as the weight of the collected particles is sufficiently high, the valve opens so that the dirt particles can escape into the environment.

DE 10 2014 011 444 A1 shows a filter device with a hollow-cylindrical filter element that, adjacent to an end disk, comprises a housing-associated calming wall which surrounds the filter element in a ring shape and extends across an axial partial length of the filter element. A dirt outlet is provided in the filter housing at the bottom.

SUMMARY OF THE INVENTION

It is the object of the invention to configure a filter device with simple constructive measures in such a way that dirt particles are separated in an effective way from the fluid flow to be filtered.

This object is solved according to the invention in that the dirt collecting region adjoins a flow-tight separation element at or adjacent to the filter medium body of the filter element and in that the dirt collecting region in radial direction, relative to the longitudinal axis of the annular filter medium body, comprises a larger extension than an inflow region immediately adjoining the dirt collecting region and positioned at the inflow side of the filter medium body, wherein the dirt collecting region is of an annular circumferentially extending configuration.

The dependent claims provide expedient further embodiments.

The filter device according to the invention comprises a filter housing and a filter element, received in the filter housing, with an annular filter medium body at which the filtration of a fluid to be purified takes place. The filter device is used in particular for gas filtration, for example, for filtration of the combustion air to be supplied to an internal combustion engine. In principle, however, a use for liquid fluids is conceivable also.

The annular filter medium body of the filter element is flowed through by the fluid to be purified in radial direction, in particular radially from the exterior to the interior, so that the outer side of the filter medium body is the inflow side or raw side and the inwardly positioned side the clean side. In principle, a reverse flow through the filter medium body radially from the interior to the exterior is also conceivable. The filter medium body is in particular of an annular closed configuration and comprises an inwardly positioned flow space for the fluid. In case of a flow through the filter medium body radially from the exterior to the interior, the purified fluid is axially discharged from the inwardly positioned flow space.

In the filter housing, a dirt collecting region is provided which is in flow communication with the receiving space for receiving the filter element. The dirt collecting region is in particular integrated into the filter housing. The dirt collecting region receives dirt particles which are separated from the fluid prior to flowing through the filter medium body. Via the dirt collecting region, the dirt particles can be discharged advantageously from the filter housing.

The dirt collecting region comprises in radial direction, relative to the longitudinal axis of the annular filter medium body and of the filter element, a larger extension than an inflow region within the receiving space that extends to the inflow side of the filter medium body. The radially larger extension of the dirt collecting region provides for a flow calming action whereby the separation of the dirt particles from the fluid is promoted.

The dirt collecting region is of an annular circumferentially extending configuration. This enables an annular flow and deposition of the dirt particles in the dirt collecting region. Particles guided axially in the direction of the dirt collecting region reach independent of their circumferential position the radially expanded section of the dirt collecting region and experience there a flow calming action and deposition at the wall of the dirt collecting region.

The dirt collecting region adjoins a flow-tight separation element which is located either immediately at the filter medium body or at least adjacent to the filter medium body. The flow-tight separation element extends across a partial surface of the filter medium body and prevents or reduces at least an inflow of the filter medium body in this section whereby a flow calming action of the raw fluid at the inflow side of the filter medium body is achieved.

The separation element is embodied, for example, as a calming wall or as a separation film and prevents that the fluid to be purified flows at the inflow side at the position of the separation element immediately through the filter medium body. The unpurified raw fluid guided in the direction toward the inflow side is prevented from immediately flowing through the filter medium body at the position of the separation element and is therefore forced to reside in the space at the inflow side of the filter medium body for at least a slightly longer period of time, which entails a flow calming action. Subsequent thereto, the unpurified fluid can flow through the filter medium body. The flow calming action has the result that larger dirt particles entrained in the raw fluid can deposit in the space that is upstream of the inflow side of the filter medium body. Therefore, a preseparation is taking place wherein the separated particles advantageously can be discharged via a discharge valve from the filter housing. Due to the preseparation, the dirt load of the filter medium body is reduced.

According to an advantageous embodiment, the separation element is located at the filter housing in which the filter element with the filter medium body is received. The separation element can be embodied, as needed, as one piece together with the filter housing. For example, the separation element is a calming wall which surrounds the filter medium body in a ring shape and comprises a distance relative to the outer side of the filter medium body.

According to a further advantageous embodiment, the separation element is arranged immediately at the filter element, for example, is applied to the outer side of the filter medium body. For example, the separation element is a separation film which is applied immediately onto the outer side of the filter medium body. In the region of the separation film, no immediate radial inflow into the filter medium body is possible. In a folded configuration of the filter medium body, the separation film is resting on the outer edges of the filter folds, wherein spreading of raw fluid at the inflow side is possible along the longitudinal extension of the filter folds. In this way, raw fluid which radially enters at a location of the filter medium body without such a separation film can be guided along the longitudinal extension of the folds axially to the region in which the separation film is located whereupon the filter medium body is radially flowed through in this section also. In this way, the section of the filter medium body which is covered by the separation film can also be used for filtration.

In a further advantageous embodiment, it is possible to provide a separation element in the form of a housing-associated calming wall as well as a further separation element in the form of a filter element-associated separation film. These two separation elements are located in particular at axially oppositely positioned sides of the filter medium body of the filter element.

In any case, it is expedient that the separation element, or the sum of all separation elements, extends only across a partial surface at the inflow side of the filter medium body so that a further partial section at the inflow side of the filter medium body remains free of such a separation element.

According to yet another advantageous embodiment, the separation element extends, beginning at an axial end face of the filter medium body, in axial direction as well as completely in circumferential direction of the filter medium body. The axial extension of the calming element is however in any case less than the axial total length of the filter medium body so that a partial section of the filter medium body remains free of the separation element. Advantageously, the axial extension of a separation element is maximally as large as half the axial total length of the filter medium body, for example, maximally only as large as a third of the axial total length of the filter medium body.

In case of a separation film as a separation element, it is expedient that the separation film is connected fixedly to the filter medium body, for example, by gluing or by welding.

In a further advantageous embodiment, the filter medium body is of a folded configuration wherein the length extension of the filter folds extends in axial direction, relative to the longitudinal axis of the filter element.

According to an advantageous embodiment, a discharge valve is arranged in or at the dirt collecting region that can be adjusted between a closed and an open position, preferably a duckbill valve, which closes when a vacuum relative to environment is applied. For discharging the particles collected in the dirt collecting region, the discharge valve is adjusted from the closed into the open position, for example, by manual actuation, by vibration, or by a transfer of the system into a pressureless state (at standstill). The active adjustment of the discharge valve can be realized either in a manually controlled way or by means of an actuator. Possible, as described, is also a passive embodiment of the discharge valve, in particular such that by external action the discharge valve is transferred from the closed into the open position, for example, by the collected dirt particles' own weight or by the vacuum of a component connected to the discharge valve, for example, a line that is connected to a vacuum side of a device, for example, to a cooling fan.

The dirt collecting region is integrated into the filter housing and forms a section of the filter housing. Advantageously, the dirt collecting region in the filter housing is axially adjacent to the outflow side of the filter element and/or axially spaced apart from the inlet opening, preferably at the end of the filter housing which is opposite in relation to the inlet opening, which makes it possible to perform a separation of dirt particles from the fluid across the entire inner side of the housing wall of the filter housing, prior to the dirt particles reaching the dirt collecting region. The dirt particles are transported radially outwardly by the centrifugal forces; this effect is reinforced by the increasing number of circulations of the flow about the filter element. The pitch of the guide vanes is thus preferably adjusted such that the flow after entry through the inlet opening circulates several times about the filter element so that as many particles as possible are transported to the inner side of the housing wall prior to the particles being carried across the axial length in the direction of the circumferential dirt collecting space.

The dirt collecting region is preferably embodied as one piece together with the filter housing. For example, a wall of the dirt collecting region extends as a part of the housing wall farther radially outwardly than an immediately axially neighboring region of the housing wall of the filter housing. The dirt collecting region in this embodiment is a circumferentially extending, radially outwardly projecting expansion of the housing wall of the filter housing.

In addition or as an alternative, it is also possible that such a radial expansion of the filter housing is omitted and instead the dirt collecting region extends axially into the region that is adjacent to an end face of the filter element. Optionally, the dirt collecting region is located completely axially outwardly of the filter medium body and is positioned adjacent to an end face of the filter medium body. In this case, an end disk which is arranged at the filter medium body forms a separation element that separates the dirt collecting region from the filter medium body. Moreover, it can be expedient that the dirt collecting region radially adjoins an outlet socket which adjoins an end face of the filter medium body and via which the purified fluid is axially discharged from the inwardly positioned flow space in the filter medium body.

Optionally, the dirt collecting region which is arranged axially at the end face of the filter element and of the filter medium body can be combined with a radially expanded housing wall. Moreover, it is possible that the dirt collecting region in axial direction extends partially along the filter medium body and partially outside of the filter medium body and is arranged adjacent to the end face of the filter element.

The end disk adjacent to which advantageously the dirt collecting region is arranged is in particular an end disk of open configuration which flow-tightly covers only the filter medium body. In case of radial flow through the filter medium body from the exterior to the interior, clean fluid in the inwardly positioned flow space can be discharged axially from the filter medium body via a central cutout in the end disk.

According to a further expedient embodiment, the filter medium body comprises an elongate cross-sectional shape, for example, an oval or ovalized cross-sectional shape. Non-oval elongate cross-sectional shapes are also conceivable, for example, concavely curved longitudinal sides or straight-surfaced, flat longitudinal sides or non-oval curved convex longitudinal sides. The extension of the longitudinal sides is larger than the extension of the narrow sides; for example, it can be expedient that the extension of the longitudinal sides is at least twice as large as the extension of the narrow sides. The narrow sides are provided, for example, with a semi-circular cross-sectional shape. The elongate cross-sectional shape of the filter medium body or of the filter element has the advantage that installation spaces that are of a relatively low height can be used for the filter device. Also, a large inflow surface is provided at the longitudinal sides of the filter medium body.

As an alternative to an elongate cross-sectional shape, a circular cross-sectional shape of the filter medium body is conceivable also.

The filter element or the filter medium body can have across the axial length, relative to the longitudinal axis of the filter element, a non-constant cross section that changes from one end face to the oppositely positioned end face. For example, the cross section increases from the closed end disk to the oppositely positioned open end disk.

As an alternative to a non-constant cross section, filter elements or filter medium bodies with a constant cross section across the length are possible also. It can be expedient that two housing parts of the filter housing abut each other in the dirt collecting region. Possible is however also a one-piece configuration of the filter housing in the dirt collecting region.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
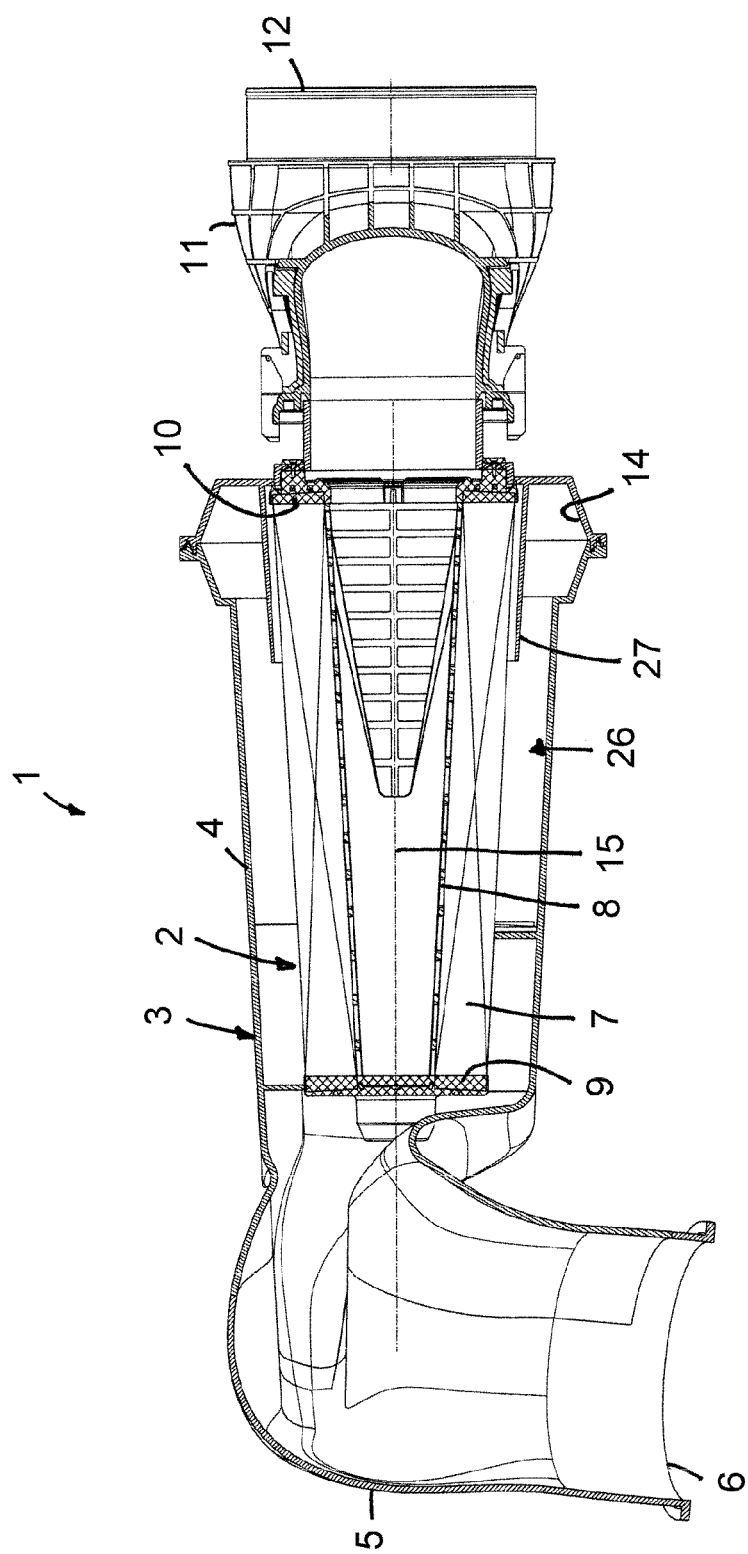
FIG. 1 shows a longitudinal section through a filter device which is embodied as an air filter for an internal combustion engine, with a filter element with annular filter medium body and with an annular circumferentially extending, radially expanded dirt collecting chamber in the filter housing.
Figure 2:
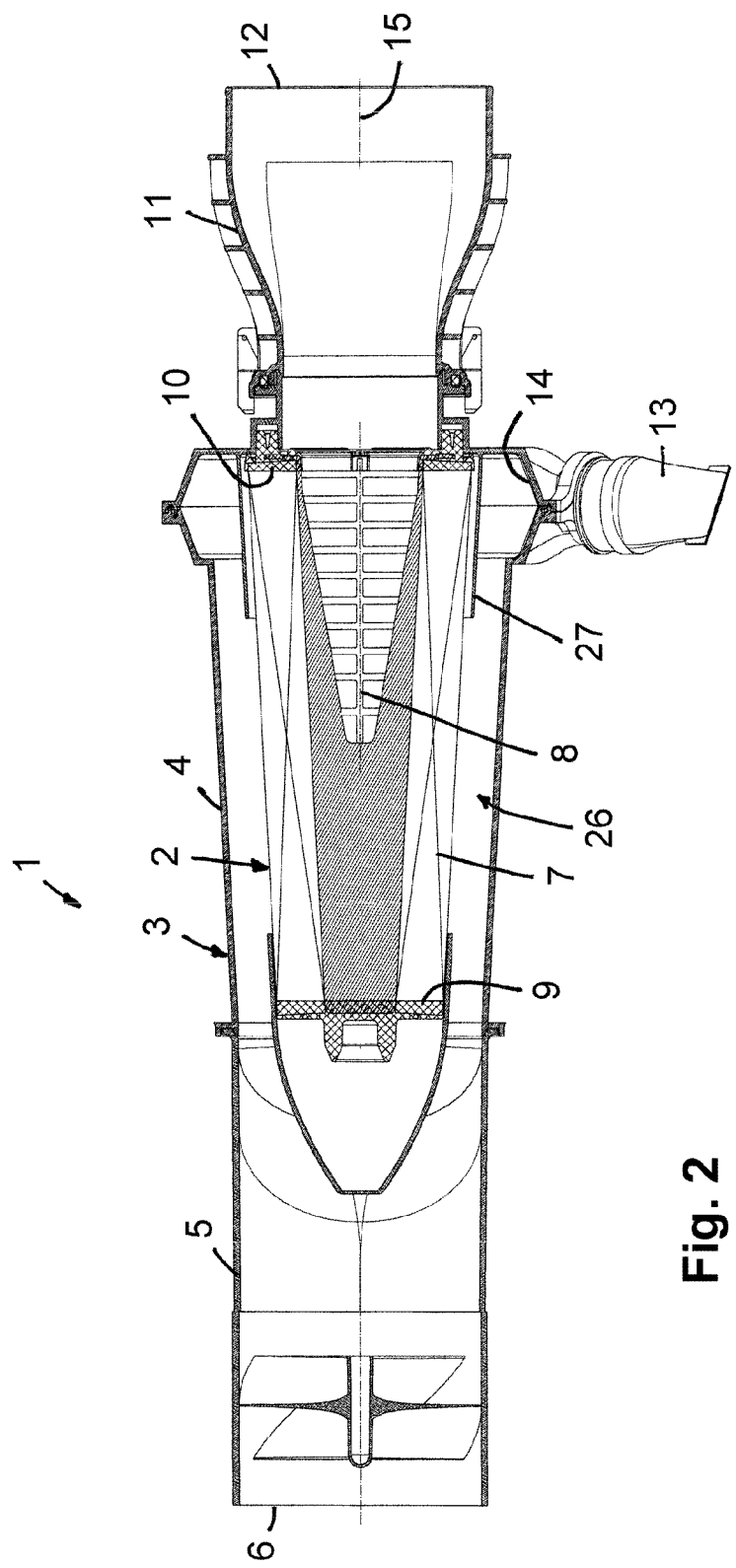
FIG. 2 shows a filter device similar to the filter device of FIG. 1 in a further longitudinal section rotated by 90° which differs from the filter device of FIG. 1 in regard to the means for generating swirl.

In the embodiment according to the FIGS. 1 and 2, two variants of a filter device 1 are illustrated that are embodied as an air filter in an intake manifold of an internal combustion engine for filtration of the combustion air to be supplied to the cylinders of the internal combustion engine. In the variant according to FIG. 1, the flow is transferred due to the shape and the channel course of the inlet housing 5 into a flow circulating about the filter element 2; in the variant according to FIG. 2 due to a guide vane assembly. The filter device 1 comprises a filter element 2 that is of a hollow-cylindrical configuration or embodied with an elongate cross-sectional shape and is arranged in a filter housing 3 which comprises a filter base housing 4 and an upstream inlet housing 5. The filter base housing 4 and the inlet housing 5 at which an inflow opening 6 is provided are of a one-piece configuration. The filter base housing 4 receives the filter element 2 in its receiving space 26. The combustion air to be filtered is introduced via the laterally arranged inflow opening 6 into the filter housing 3 and guided in the direction toward the filter element 2. Relative to the central longitudinal axis 15 of the filter element 2, the inflow opening 6 is laterally or radially displaced wherein the inflow axis of the inflow opening 6 is positioned at an angle of approximately 90° relative to the central longitudinal axis 15 of the filter element 2.

The filter element 2 comprises a filter medium body 7 which is embodied in an annular closed configuration and provided with an elongate cross-sectional shape. Relative to its central longitudinal axis 15, the filter medium body 7 is flowed through in radial direction from the exterior to the interior by the fluid to be filtered, the combustion air, so that the outer side of the filter medium body 7 forms the raw side or inflow side and the inner side the clean side. The filter medium body 7 is lined at its inner side or clean side by a support frame 8 which is comprised of plastic material. The inwardly positioned flow space in the filter medium body 7 forms the clean space in which the purified fluid is collected and from which the purified fluid is axially discharged.

At the two oppositely positioned end faces of the filter element 2, an end disk 9, 10 is arranged, respectively, wherein the first end disk 9 neighboring the inflow opening 6 is embodied in a closed configuration and the second oppositely positioned end disk 10 facing away from the inflow opening 6 is embodied in an open configuration so that the fluid can flow axially out of the inwardly positioned clean space via the open end disk 10. Adjacent to the open end disk 10 of the filter element 2, a housing-associated outlet section 11 adjoins the filter base housing 4 and comprises an outflow opening 12 via which the purified fluid is discharged from the filter device 1. The outlet section 11 is embodied separate from the filter base housing 4, but connected to the filter base housing 4.

The cross-sectional shape of the filter element 2 or of the filter medium body 7 can be of an elongate configuration wherein the longitudinal sides in an exemplary fashion extend flat and parallel to each other and are connected by curved narrow sides. However, a circular cross-sectional shape of the filter element 2 and of the filter medium body 7 is possible also.

Across the axial length, relative to the central longitudinal axis 15, the filter element 2 and the filter medium body 7 comprise a non-constant cross section which in the region of the closed end disk 9 is smaller than in the oppositely positioned region with the open end disk 10 and increases continuously and uniformly from the smaller to the larger cross section.

Adjacent to the housing-associated outlet section 11, in the filter base housing 4, the wall of the filter housing 3 has an annular radially expanded circumferential wall portion (at 14 FIGS. 1 and 2) forming a radially expanded annular space 14 providing a dirt collection region in the interior of the filter housing 3. A discharge valve 13 is arranged at the radially expanded dirt collection region. In the radially expanded dirt collecting region 14 that is of an annular configuration, separated dirt particles can collect which can be discharged via the discharge valve 13 from the filter housing 3.

The discharge valve 13 is preferably embodied as a passive valve that can be adjusted by external influences from the usually closed position into an open position in which the dirt particles can be discharged. For example, it is possible to connect the discharge valve 13 to a vacuum source, e.g. to the vacuum side of a cooling fan in a vehicle, so that the discharge valve 13 is opened at sufficiently high vacuum pressure.

The dirt collecting region 14 communicates with the receiving space 26 at the raw side or inflow side of the filter medium body 7. Axially, the dirt collecting region 14 is located adjacent to the end disk 10 of open configuration at the outflow side of the filter element 2. Relative to the axial total length of the filter element 2, the dirt collecting region 14 extends across an axial partial length that amounts to not more than 20% of the total length of the filter element 2. The dirt collecting region 14 is expanded radially relative to the immediately neighboring housing wall of the filter base housing 4. At the axial center of the dirt collecting region 14, the filter base housing 4 and the outlet section 11 of the housing abut each other.

In radial direction, the dirt collecting region 14 is separated from the filter medium body 7 by a circumferentially extending, conically configured calming wall 27. The calming wall 27 forms the radially inwardly positioned boundary wall of the dirt collecting chamber 14. The calming wall 27 extends circumferentially and is positioned at a minimal spacing to the inflow side or raw side of the filter medium body 7. In axial direction, the calming wall 27 extends from an end face section of the filter housing 3, in particular of the outlet section 11, at the level of the end disk 10 past the axial extension of the dirt collecting region 14. The axial length of the calming wall 27 amounts to, for example, at least one fourth of the axial total length of the filter element 2. The calming wall 27 ensures a flow calming action in this axial section in the receiving space 26 and reduces in this section the inflow of the filter medium body 7. The dirt collecting region 14 is in flow communication with the receiving space 26.

Due to the flow calming action and the larger radial extension of the dirt collecting region 14 in comparison to the immediately neighboring housing wall of the filter base housing 4, dirt particles can deposit in the dirt collecting region 14 which are subsequently discharged through the discharge valve 13.

Figure 3:
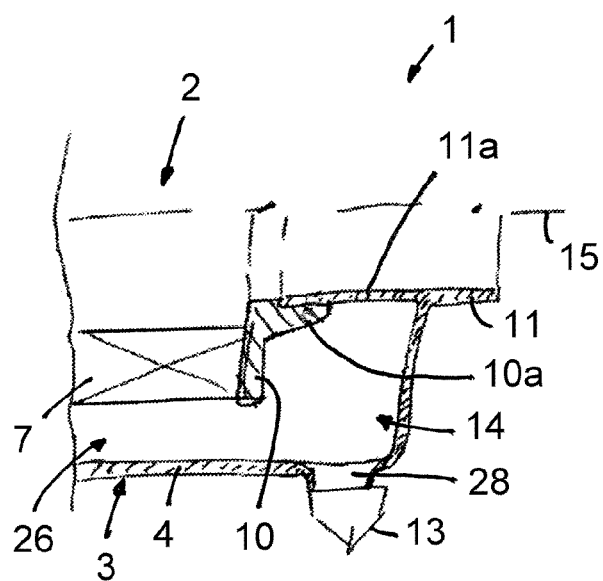
FIG. 3 shows a partial section through a filter device in an embodiment variant.

In FIG. 3, an embodiment variant of a filter device 1 is illustrated in which the filter element 2 basically comprises the same configuration as in the first embodiment and comprises an annular closed filter medium body 7 which is closed at its outflow side by an open end disk 10, wherein through the opening in the end disk 10 the purified fluid can be discharged axially through the outlet section 11. The dirt collecting region 14 adjoins axially the end disk 10 and is positioned thus axially outwardly of the filter medium body 7. The dirt collecting region 14 is delimited axially by the end disk 10 which forms a flow-tight separation element between the filter medium body 7 and the dirt collecting region 14.

At the end disk 10, an axially extending socket 10a is integrally formed which forms a sealing socket and is contacting seal-tightly the outer side of an outflow channel in the outlet section 11. The outflow channel 11a is formed as one piece together with the outlet section 11 of the housing. The dirt collecting region 14 is delimited radially inwardly partially by the axial sealing socket 10a of the end disk 10 and partially by the outflow channel 11a of the outlet section 11.

In the housing wall of the filter base housing 4, a discharge opening 28 is provided in the dirt collecting region 14 and adjoined by the discharge valve 13. The discharge opening 28 and the discharge valve 13 are arranged axially completely in the dirt collecting region 14 and are thus axially outwardly of the filter medium body 7.

The radial extension of the annular dirt collecting region 14 is larger than the radial extension of the receiving space 26 in the region of the filter medium body 7 and thus of the inflow region of the filter medium body 7. The outflow channel 11a and the sealing socket 10a have a smaller radius than the outer side of the filter medium body 7 so that correspondingly the dirt collecting region 14 is provided with the larger radial extension. The radial outer side of the dirt collecting region 14 is formed by the outer wall of the filter base housing 4 without additional radial bulging. The axial boundary at the side of the dirt collecting region 14 facing away from the filter medium body 7 is formed by a wall section of the housing-associated outlet section 11.

Figure 4:
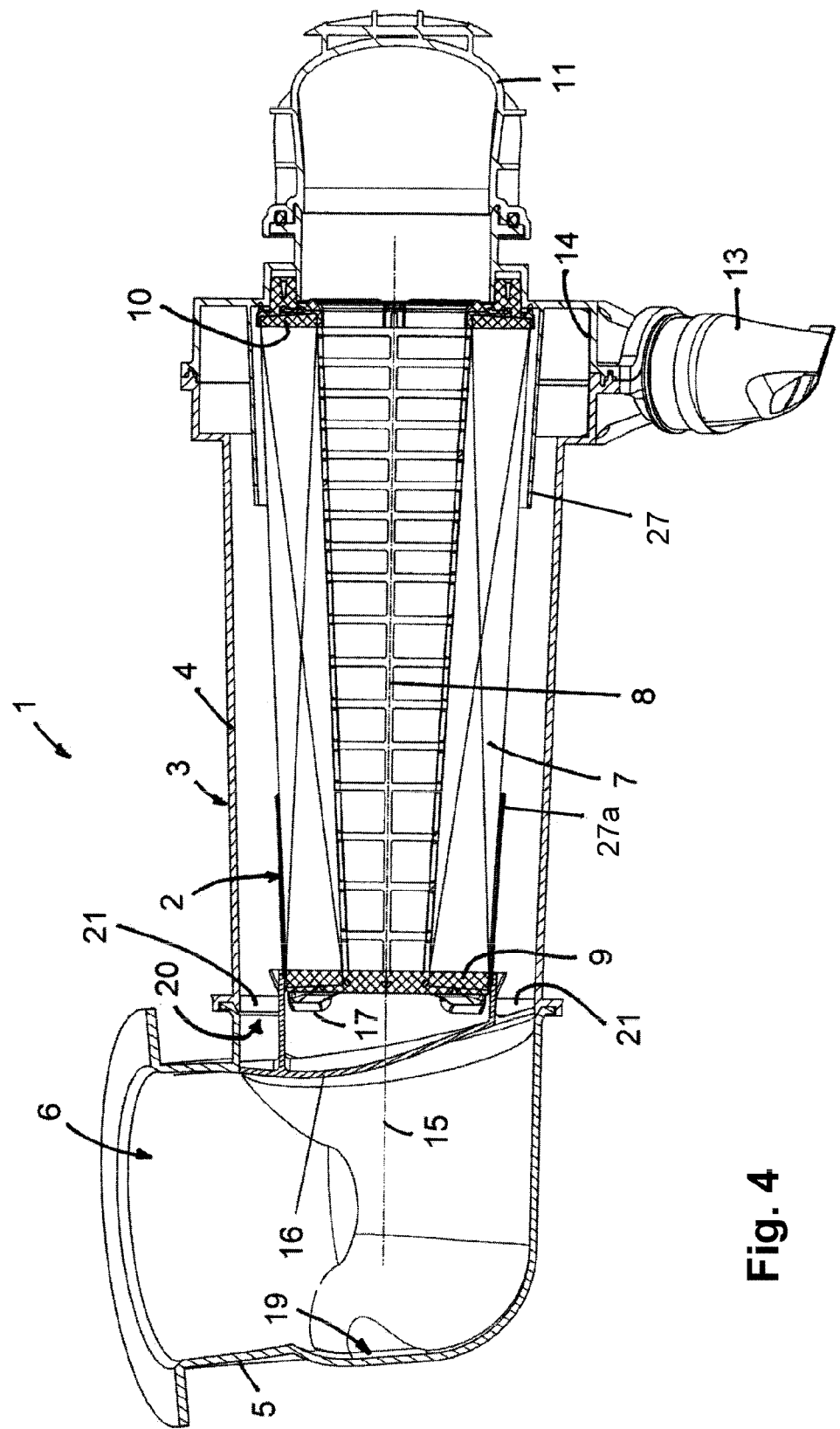
FIG. 4 shows a filter device embodied as an air filter in an embodiment variant.

In FIG. 4, an embodiment variant of a filter device 1 embodied as an air filter is illustrated. The filter device 1 according to FIG. 4 comprises a filter element 2 which is embodied hollow-cylindrical or with elongated cross-sectional shape and arranged in a filter housing 3 which comprises a filter base housing 4 and an upstream inlet housing 5. The filter base housing 4 and the inlet housing 5 at which an inflow opening 6 is located are of a one-piece configuration. The filter base housing 4 receives the filter element 2 in its receiving space 26. The combustion air to be filtered is introduced through the laterally arranged inflow opening 6 into the filter housing 3 and guided in the direction toward the filter element 2. Relative to the central longitudinal axis 15 of the filter housing 2, the inflow opening 6 is positioned laterally or radially displaced wherein the inflow axis of the inflow opening 6 is positioned at an angle of approximately 90° relative to the central longitudinal axis 15 of the filter element 2.

The filter element 2 comprises a filter medium body 7 that is of an annular closed configuration and provided with an elongated cross-sectional shape. The filter medium body 7, relative to its central longitudinal axis 15, is flowed through radially from the exterior to the interior by the fluid to be filtered, the combustion air, so that the outer side of the filter medium body 7 forms the raw side or inflow side and the inner side the clean side. The filter medium body 7 at its inner side or clean side is lined by a support frame 8 which is comprised of plastic material. The inwardly positioned flow space in the filter medium body 7 forms the clean space in which the purified fluid is collected and from which the purified fluid is axially discharged.

At the two oppositely positioned end faces of the filter element 2, an end disk 9, 10 is arranged, respectively, wherein the first end disk 9 neighboring the inflow opening 6 is embodied in a closed configuration and the second oppositely positioned end disk 10 facing away from the inflow opening 6 is embodied in an open configuration so that the fluid can flow axially out of the inwardly positioned clean space via the open end disk 10. Adjacent to the open end disk 10 of the filter element 2, a housing-associated outlet section 11 adjoins the filter base housing 4 and comprises an outflow opening 12 via which the purified fluid is discharged from the filter device 1. The outlet section 11 is embodied separate from the filter base housing 4, but connected to the filter base housing 4.

The cross-sectional shape of the filter element 2 or of the filter medium body 7 can be embodied elongate wherein the longitudinal sides in an exemplary fashion extend flat and parallel to each other and are connected by curved narrow sides. However, a circular cross-sectional shape of the filter element 2 and of the filter medium body 7 is also possible.

The filter element 2 and the filter medium body 7 have across the axial length, relative to the central longitudinal axis 15, a non-constant cross section that is smaller in the region of the closed end disk 9 than in the oppositely positioned region with the open end disk 10 and increases continuously and uniformly from the smaller to the larger cross section.

Adjacent to the housing-associated outlet section 11, in the filter base housing 4 a radially expanded annular space 14 is provided which forms a dirt collecting region and at which a discharge valve 13 is arranged. In the radially expanded dirt collecting region 14 which is of an annular configuration, the separated dirt particles can collect which can be discharged via the discharge valve 13 from the filter housing 3.

The discharge valve 13 is preferably embodied as a passive valve that can be adjusted by external influences from the usually closed position into an open position in which the dirt particles can be discharged. For example, it is possible to connect the discharge valve 13 to a vacuum source, e.g., to the vacuum side of a cooling fan in a vehicle, so that the discharge valve 13 is opened at sufficiently high vacuum.

The dirt collecting region 14 communicates with the receiving space 26 at the raw side or inflow side of the filter medium body 7. The dirt collecting region 14 is located axially adjacent to the end disk 10 of open configuration at the outflow side of the filter element 2. Relative to the axial total length of the filter element 2, the dirt collecting region 14 extends across an axial partial length that amounts to not more than 20% of the total length of the filter element 2. The dirt collecting region 14 is radially expanded relative to the immediately adjoining housing wall of the filter base housing 4. At the axial center of the dirt collecting chamber 14, the filter base housing 4 and the outlet section 11 of the housing abut each other.

In radial direction, the dirt collecting region 14 is separated by a separation element 27 from the filter medium body 7 wherein the separation element 27 is embodied as a circumferentially extending, conically embodied calming wall 27 which is part of the filter housing 3. The calming wall 27 forms the radially inwardly positioned boundary wall of the dirt collecting chamber 14. The calming wall 27 extends circumferentially all around and is positioned at a minimal distance relative to the inflow side or raw side of the filter medium body 7. In axial direction, the calming wall 27 extends from an end face section of the filter housing 3, in particular of the outlet section 11, at the level of the end disk 10 past the axial extension of the dirt collecting region 14. The axial length of the calming wall 27 amounts to, for example, at least one fourth of the axial total length of the filter element 2. The calming wall 27 provides for a flow calming action in this axial section in the receiving space 26 and reduces in this section the inflow into the filter medium body 7. The dirt collecting region 14 is in flow communication with the receiving space 26.

Due to the flow calming action and the larger radial extension of the dirt collecting region 14 in comparison to the immediately neighboring housing wall of the filter base housing 4, dirt particles can deposit in the dirt collecting region 14 and are subsequently discharged via the discharge valve 13.

The calming wall 27 is located axially adjacent to the open end disk 10 and extends in axial direction, beginning at the open end disk 10, across a partial region of the filter medium body 7.

The axially oppositely positioned side is provided with a further separation element 27a in the form of a separation film which is applied immediately onto the filter medium body 7. The separation film 27a extends, beginning at the closed end disk 9, in axial direction so that the calming wall 27 and the separation film 27a extend from oppositely positioned end faces axially in the direction toward the center of the filter medium body 7. The axial length of the calming wall 27 and of the separation film 27a is at least approximately of the same size. At the center between the two separation elements 27 and 27a, a partial section of the filter medium body 7 is provided which is free of separation elements and thus can immediately receive radially incoming flow of the raw fluid to be purified.

Both separation elements 27 and 27a provide for a flow calming action of the raw fluid flowing into the inflow space at the inflow side of the filter medium body so that it is made possible that coarse dirt particles deposit in the annular space 14 and can be discharged via the discharge valve 13. Despite the separation elements 27 and 27a, the raw fluid can flow into the filter medium body 7 across its entire axial length and its entire inflow side. The calming wall 27 is positioned radially at a distance to the inflow side of the filter medium body 7 so that an annular space is formed between the calming wall 27 and the inflow side of the filter medium body into which the raw fluid can flow.

The filter medium body 7 is of a folded configuration wherein the longitudinal extension of the folds extends parallel to the longitudinal axis 15 of the filter element. In the region of the calming film 27a that is applied immediately onto the filter medium body 7 and, for example, is welded or glued to the filter medium body 7, the raw fluid can flow along the folds of the filter medium body 7, beginning at the partial section of the filter medium body without separation element, axially into the partial region which is covered by the separation film 27a. In this way, the filter medium body 7 is available for filtration of the raw fluid even in the region of the separation film 27a.

What is claimed is:

1. A filter device comprising:
a filter element comprising:
an annular filter medium body radially surrounding a central longitudinal axis and having an open interior;
wherein the annular filter medium body has an inflow side;
a filter housing comprising
a circumferential housing wall surrounding a receiving space within an interior the filter housing,
wherein the filter element is arranged in the receiving space of the filter housing;
wherein the circumferential housing wall includes an annular radially expanded circumferential wall portion of the circumferential housing wall, forming a radially expanded dirt collection region in the interior of the filter housing,
wherein the annular radially expanded circumferential wall portion projects radially outwardly beyond remaining portions of the circumferential housing wall, forming and the dirt collection region in the filter housing;

wherein, relative to an axial total length of the filter element, the dirt collecting region extends axially across an axial partial length that amounts to not more than 20% of a total axial length of the filter element;

wherein the annular radially expanded circumferential wall portion of the circumferential housing wall has a radially outer diameter larger than a radially outer diameter of the remaining portions of the circumferential housing wall;

a flow-tight separation element arranged at or adjacent to the annular filter medium body of the filter element, wherein the dirt collecting region adjoins the flow-tight separation element;

an inflow region positioned at the inflow side of the annular filter medium body and immediately adjoining the dirt collecting region;

the dirt collecting region comprising
- a radial extension in a radial direction, relative to a longitudinal axis of the annular filter medium body,
- wherein the radial extension of the dirt collecting region is larger than a radial extension of the inflow region.

2. The filter device according to claim 1, further comprising
a discharge valve arranged at the dirt collecting region.

3. The filter device according to claim 1, wherein
the dirt collecting region is arranged axially adjacent to an outflow side of the filter element.

4. The filter device according to claim 1, wherein
the flow-tight separation element is a calming wall arranged in the inflow region at the inflow side of the filter medium body,
wherein the calming wall extends across a partial axial length of the filter medium body.

5. The filter device according to claim 4, wherein
the calming wall is a part of the filter housing.

6. The filter device according to claim 4, wherein
the calming wall is hollow-cylindrical or conical.

7. The filter device according to claim 4, wherein
the calming wall extends axially past the dirt collecting region.

8. The filter device according to claim 1, wherein
the dirt collecting region extends into a region that is positioned adjacent to an end face of the filter element.

9. The filter device according to claim 8, wherein
the dirt collecting region adjoins an outlet channel of the filter housing,
wherein the outlet channel of the filter housing adjoins an end face of the annular filter medium body.

10. The filter device according to claim 1, wherein
the dirt collecting region extends into a region that is positioned adjacent to an end face of the filter element.

11. The filter device according to claim 10, wherein
the dirt collecting region adjoins an outlet channel of the filter housing,
wherein the outlet channel of the filter housing adjoins an end face of the annular filter medium body.

12. The filter device according to claim 1, wherein
the filter element comprises
an end disk arranged at an end face of the annular filter medium body,
wherein the flow-tight separation element is formed by the end disk.

13. The filter device according to claim 1, comprising
two of said flow-tight separation element,
wherein said two flow-tight separation elements are arranged opposite each other at axially oppositely positioned sides of the annular filter medium body.

* * * * *